US012260175B2

(12) United States Patent
Gupta et al.

(10) Patent No.: US 12,260,175 B2
(45) Date of Patent: Mar. 25, 2025

(54) METHOD AND SYSTEM FOR CONTEXT-DRIVEN CONVERSATION AUTOMATION PIPELINE

(71) Applicant: JPMorgan Chase Bank, N.A., New York, NY (US)

(72) Inventors: Niyati Gupta, Jaipur (IN); Kana Uchida, Singapore (SG); Dhiraj Unhale, Thane (IN); Sanjay Rao, Thane (IN); Hendrik Sepp, London (GB); Emi Miyata, Hong Kong (HK); Sagar Sakhare, Pune (IN); Ujjwal Sihag, Pilani (IN)

(73) Assignee: JPMORGAN CHASE BANK, N.A., New York, NY (US)

( * ) Notice: Subject to any disclaimer, the term of this patent is extended or adjusted under 35 U.S.C. 154(b) by 301 days.

(21) Appl. No.: 17/874,643

(22) Filed: Jul. 27, 2022

(65) Prior Publication Data

US 2023/0401380 A1 Dec. 14, 2023

(30) Foreign Application Priority Data

Jun. 14, 2022 (IN) .............................. 202211034136

(51) Int. Cl.
*G06F 40/20* (2020.01)
*G06F 40/40* (2020.01)
(Continued)

(52) U.S. Cl.
CPC .............. *G06F 40/20* (2020.01); *G06F 40/40* (2020.01); *G06Q 30/0201* (2013.01); *H04L 51/02* (2013.01); *H04L 51/216* (2022.05)

(58) Field of Classification Search
CPC ....... G06F 40/20; G06F 40/40; H04L 51/216; H04L 51/02; G06Q 30/2021
(Continued)

(56) References Cited

U.S. PATENT DOCUMENTS

2017/0068904 A1* 3/2017 Korycki ................. G06N 20/00
2017/0068906 A1* 3/2017 Korycki ................. G06N 20/00
(Continued)

FOREIGN PATENT DOCUMENTS

JP 2024514069 A * 3/2022

OTHER PUBLICATIONS

J. Dunne and D. Malone, "Different every time: A framework to model real-time instant message conversations," 2017 21st Conference of Open Innovations Association (FRUCT), Helsinki, Finland, 2017, pp. 88-99, doi: 10.23919/FRUCT.2017.8250169. keywords: {Kernel;Real-time systems;Data models;Collaborati (Year: 2017).*
(Continued)

*Primary Examiner* — Bharatkumar S Shah
(74) *Attorney, Agent, or Firm* — GREENBLUM & BERNSTEIN, P.L.C.

(57) ABSTRACT

A method and system for automating a process of downloading and analyzing messages from conversation rooms and chat rooms to determine topics, entities, context, and actionable items are provided. The method includes downloading a set of messages that have been communicated over a communication channel; analyzing each respective message in order to determine at least one respective topic that relates to each respective message; determining, based on a result of the analysis, metrics that relate to the set of messages; and storing historical data that relates to the downloaded set of messages and each of the metrics. The analysis may be performed by executing an artificial intelligence (AI) algorithm that is based on a Natural Language Processing (NLP) model and is trained by using the historical data.

17 Claims, 11 Drawing Sheets

(51) Int. Cl.
  *G06Q 30/0201* (2023.01)
  *H04L 51/02* (2022.01)
  *H04L 51/216* (2022.01)
(58) Field of Classification Search
  USPC .......................................................... 704/9
  See application file for complete search history.

(56) References Cited

U.S. PATENT DOCUMENTS

| | | | | |
|---|---|---|---|---|
| 2019/0327330 | A1* | 10/2019 | Natarajan | G06N 3/08 |
| 2020/0151648 | A1* | 5/2020 | Gorny | G06F 40/20 |
| 2021/0297377 | A1* | 9/2021 | Bastide | G06F 40/279 |
| 2022/0385608 | A1* | 12/2022 | Hassan | H04L 51/42 |
| 2023/0353649 | A1* | 11/2023 | Oh | H04L 67/306 |

OTHER PUBLICATIONS

S. Gianvecchio, M. Xie, Z. Wu and H. Wang, "Humans and Bots in Internet Chat: Measurement, Analysis, and Automated Classification," in IEEE/ACM Transactions on Networking, vol. 19, No. 5, pp. 1557-1571, Oct. 2011, doi: 10.1109/TNET.2011.2126591. keywords: {Humans;Delay;Internet;Malware; ayesian metho (Year: 2011).*

Technology takes to securities trading Broker/dealer who does The Internet and other communications technologies (Year: 2024).*

S. Gianvecchio, M. Xie, Z. Wu and H. Wang, "Humans and Bots in Internet Chat: Measurement, Analysis, and Automated Classification," in IEEE/ACM Transactions on Networking, vol. 19, No. 5, pp. 1557-1571, Oct. 2011, doi: 10.1109/TNET.2011.2126591. keywords: {Humans: Delay;Internet; Malware; Bayesian me (Year: 2011).*

Technology takes to securities trading Broker/dealer who does The Internet and other communications technologies (Year: 2024) (Year: 2024).*

J. Dunne and D. Malone, "Different every time: A framework to model real-time instant message conversations," 2017 21st Conference of Open Innovations Association (FRUCT), Helsinki, Finland, 2017, pp. 88-99, doi: 10.23919/F RUCT.2017.8250169. keywords: {Kernel; Real-time systems: Data models; Collabor (Year: 2017).*

* cited by examiner

METHOD AND SYSTEM FOR CONTEXT-DRIVEN CONVERSATION AUTOMATION PIPELINE

CROSS-REFERENCE TO RELATED APPLICATIONS

This application claims priority benefit from Indian Application No. 202211034136, filed Jun. 14, 2022, which is hereby incorporated by reference in its entirety.

BACKGROUND

1. Field of the Disclosure

This technology generally relates to methods and systems for analyzing chat room messages, and more particularly to methods and systems for automating a process of downloading and analyzing messages from conversation rooms and chat rooms to determine topics, entities, context, and actionable items

2. Background Information

For a large firm or organization that interacts with members of the public as customers, many firmwide operations may use conversation rooms and/or chat rooms as a major channel for communication. The management of the firm may be interested to know insights that could be determined from such communication, such as, for example, which topics are frequently discussed, what types of user queries are often submitted, and what types of tasks and actionable items arise therefrom. However, conventional chat room software does not provide an automated means for gaining such insights.

Accordingly, there is a need for a mechanism for automating a process of downloading and analyzing messages from conversation rooms and chat rooms to determine topics, entities, context, and actionable items.

SUMMARY

The present disclosure, through one or more of its various aspects, embodiments, and/or specific features or sub-components, provides, inter alia, various systems, servers, devices, methods, media, programs, and platforms for automating a process of downloading and analyzing messages from conversation rooms and chat rooms to determine topics, entities, context, and actionable items.

According to an aspect of the present disclosure, a method analyzing a chat room conversation is provided. The method is implemented by at least one processor. The method includes: downloading, by the at least one processor, a plurality of messages that have been communicated over a first communication channel during a predetermined first time interval; analyzing, by the at least one processor, each respective message from among the plurality of messages in order to determine at least one respective topic that relates to each respective message; determining, by the at least one processor based on a result of the analyzing, at least one metric that relates to the plurality of messages; and storing, in a memory by the at least one processor, historical data that relates to the downloaded plurality of messages and each of the determined at least one metric.

The analyzing may include executing an artificial intelligence (AI) algorithm that is based on a Natural Language Processing (NLP) model and uses a machine learning technique to determine the at least one respective topic that relates to each respective message.

The method may further include using the stored historical data to train the AI algorithm.

The at least one metric may include at least one from among a number of chats that were conducted over the first communication channel during the first time interval, an average response time that relates to the chats that were conducted over the first communication channel during the first time interval, and a respective active conversation duration that relates to each corresponding chat that was conducted over the first communication channel during the first time interval.

The method may further include using a Natural Language Generation (NLG) technique to automatically generate at least one response to at least one chat that was conducted over the first communication channel.

The method may further include assigning each respective topic to a corresponding category from among a predetermined set of categories. The at least one metric may include at least one category-specific metric.

The predetermined set of categories may include at least one from among a first category that relates to an execution of a trade, a second category that relates to a settlement of a transaction and a delivery associated with a completion of the transaction, a third category that relates to making a payment, a fourth category that relates to a market condition, a fifth category that relates to an initial client setup, a sixth category that relates to a client account, a seventh category that relates to billing, an eighth category that relates to a client request/instruction, a ninth category that relates to corporate action, and a tenth category that relates to reporting.

The method may further include displaying, by the at least one processor, a graphical user interface (GUI) that includes information that relates to at least one from among a result of the analyzing and the at least one metric.

According to another aspect of the present disclosure, a computing apparatus for analyzing a chat room conversation is provided. The computing apparatus includes a processor; a memory; a display; and a communication interface coupled to each of the processor, the memory, and the display. The processor is configured to: download, via the communication interface, a plurality of messages that have been communicated over a first communication channel during a predetermined first time interval; analyze each respective message from among the plurality of messages in order to determine at least one respective topic that relates to each respective message; determine, based on a result of the analysis, at least one metric that relates to the plurality of messages; and store, in the memory, historical data that relates to the downloaded plurality of messages and each of the determined at least one metric.

The processor may be further configured to execute an artificial intelligence (AI) algorithm that is based on a Natural Language Processing (NLP) model and uses a machine learning technique to determine the at least one respective topic that relates to each respective message.

The processor may be further configured to use the stored historical data to train the AI algorithm.

The at least one metric may include at least one from among a number of chats that were conducted over the first communication channel during the first time interval, an average response time that relates to the chats that were conducted over the first communication channel during the first time interval, and a respective active conversation duration that relates to each corresponding chat that was conducted over the first communication channel during the first time interval.

The processor may be further configured to use a Natural Language Generation (NLG) technique to automatically generate at least one response to at least one chat that was conducted over the first communication channel.

The processor may be further configured to assign each respective topic to a corresponding category from among a predetermined set of categories. The at least one metric may include at least one category-specific metric.

The predetermined set of categories may include at least one from among a first category that relates to an execution of a trade, a second category that relates to a settlement of a transaction and a delivery associated with a completion of the transaction, a third category that relates to making a payment, a fourth category that relates to a market condition, a fifth category that relates to an initial client setup, a sixth category that relates to a client account, a seventh category that relates to billing, an eighth category that relates to a client request/instruction, a ninth category that relates to corporate action, and a tenth category that relates to reporting.

The processor may be further configured to cause the display to display a graphical user interface (GUI) that includes information that relates to at least one from among a result of the analyzing and the at least one metric.

According to yet another aspect of the present disclosure, a non-transitory computer readable storage medium storing instructions for analyzing a chat room conversation is provided. The storage medium includes executable code which, when executed by a processor, causes the processor to: download a plurality of messages that have been communicated over a first communication channel during a predetermined first time interval; analyze each respective message from among the plurality of messages in order to determine at least one respective topic that relates to each respective message; determine, based on a result of the analysis, at least one metric that relates to the plurality of messages; and store, in a memory, historical data that relates to the downloaded plurality of messages and each of the determined at least one metric.

The executable code may further cause the processor to execute an artificial intelligence (AI) algorithm that is based on a Natural Language Processing (NLP) model and uses a machine learning technique to determine the at least one respective topic that relates to each respective message.

The executable code may further cause the processor to use the stored historical data to train the AI algorithm.

The at least one metric may include at least one from among a number of chats that were conducted over the first communication channel during the first time interval, an average response time that relates to the chats that were conducted over the first communication channel during the first time interval, and a respective active conversation duration that relates to each corresponding chat that was conducted over the first communication channel during the first time interval.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 1:
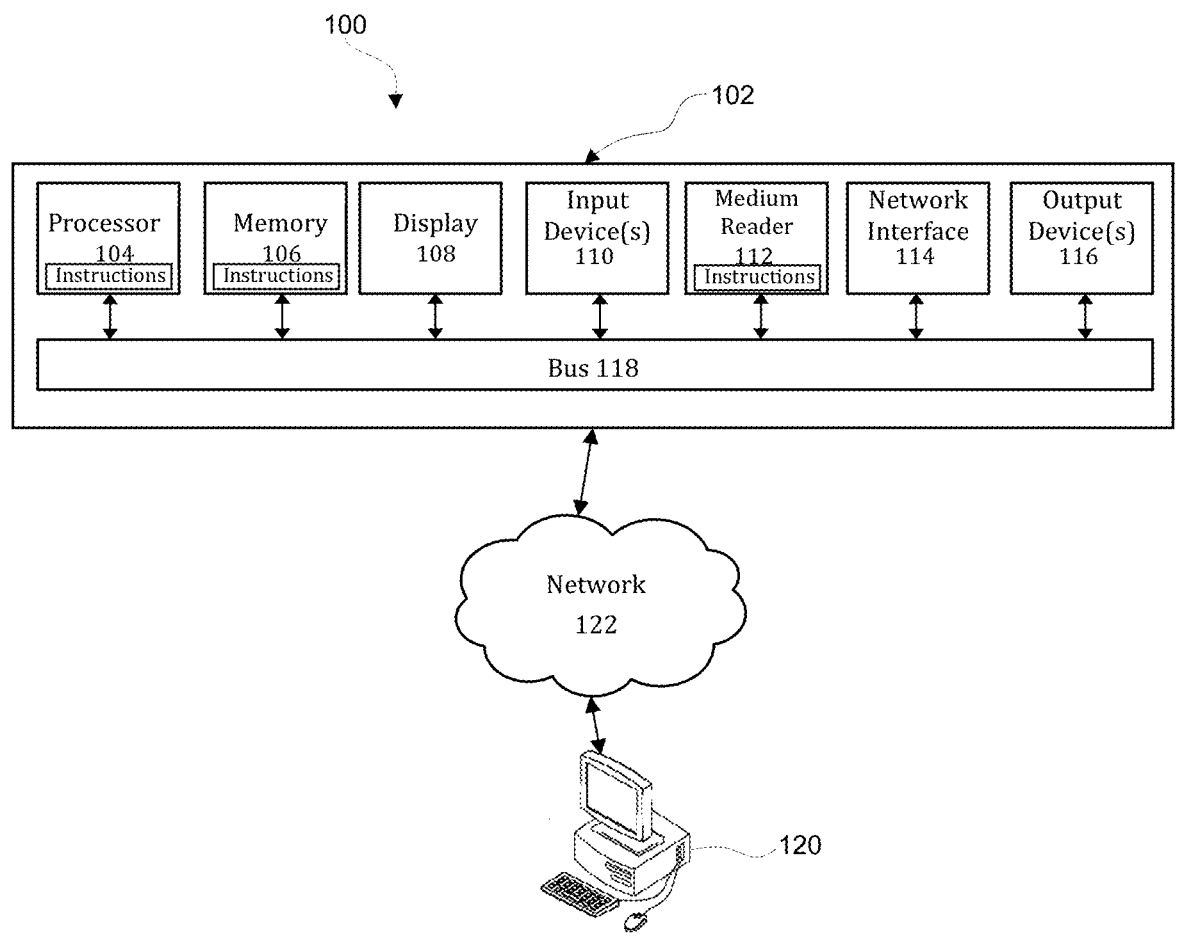
FIG. 1 illustrates an exemplary computer system.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data as well as executable instructions and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid state display, a cathode ray tube (CRT), a plasma display, or any other type of display, examples of which are well known to skilled persons.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g. software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote-control output, a printer, or any combination thereof.

Each of the components of the computer system 102 may be interconnected and communicate via a bus 118 or other communication link. As illustrated in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is illustrated in FIG. 1 as a wireless network, those skilled in the art appreciate that the network 122 may also be a wired network.

The additional computer device 120 is illustrated in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

As described herein, various embodiments provide optimized methods and systems for automating a process of downloading and analyzing messages from conversation rooms and chat rooms to determine topics, entities, context, and actionable items.

Figure 2:
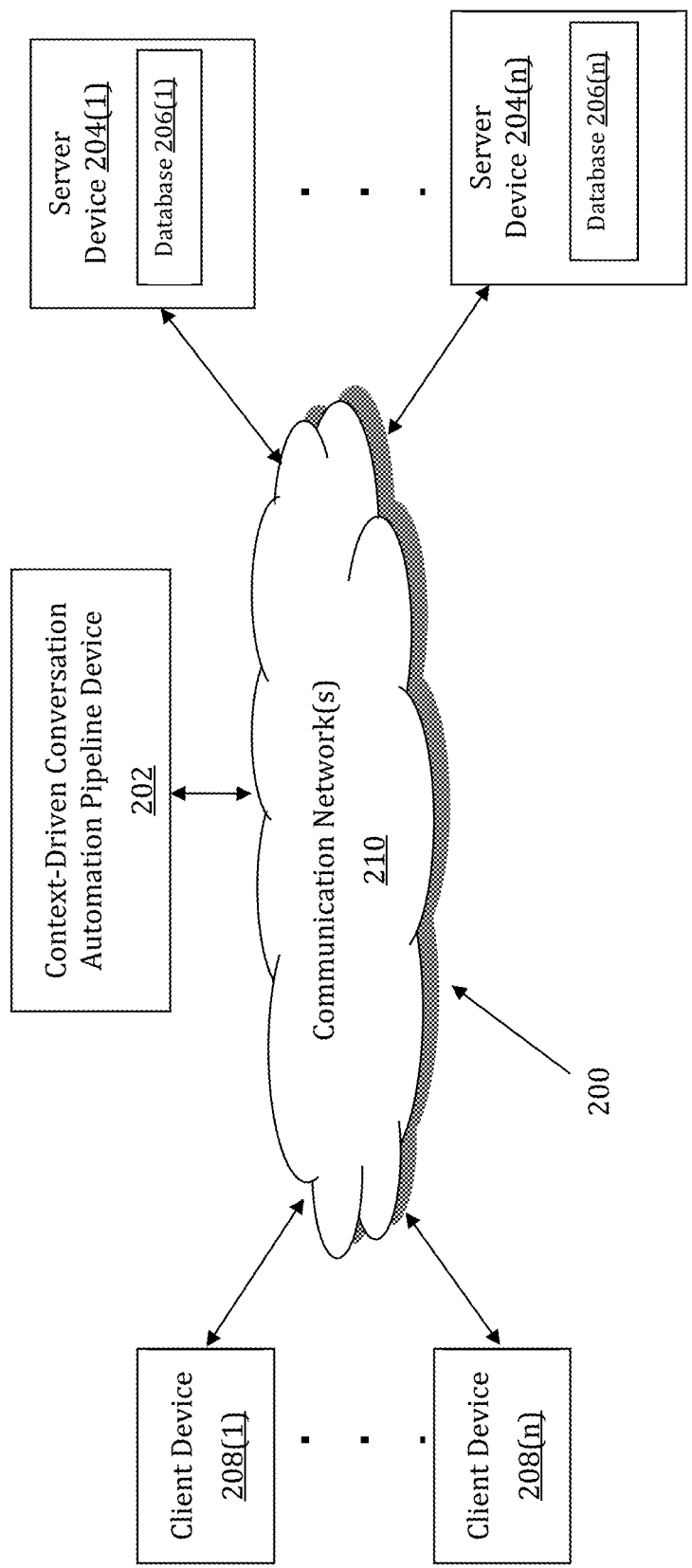
FIG. 2 illustrates an exemplary diagram of a network environment.

Referring to FIG. 2, a schematic of an exemplary network environment 200 for implementing a method for automating a process of downloading and analyzing messages from conversation rooms and chat rooms to determine topics, entities, context, and actionable items is illustrated. In an exemplary embodiment, the method is executable on any networked computer platform, such as, for example, a personal computer (PC).

The method for automating a process of downloading and analyzing messages from conversation rooms and chat rooms to determine topics, entities, context, and actionable items may be implemented by a Context-Driven Conversation Automation Pipeline (CDCAP) device 202. The CDCAP device 202 may be the same or similar to the computer system 102 as described with respect to FIG. 1. The CDCAP device 202 may store one or more applications that can include executable instructions that, when executed by the CDCAP device 202, cause the CDCAP device 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the CDCAP device 202 itself, may be located in virtual server(s) running in a cloud-based computing environment rather than being tied to one or more specific physical network computing devices. Also, the application(s) may be running in one or more virtual machines (VMs) executing on the CDCAP device 202. Additionally, in one or more embodiments of this technology, virtual machine(s) running on the CDCAP device 202 may be managed or supervised by a hypervisor.

In the network environment 200 of FIG. 2, the CDCAP device 202 is coupled to a plurality of server devices 204(1)-204(n) that hosts a plurality of databases 206(1)-206(n), and also to a plurality of client devices 208(1)-208(n) via communication network(s) 210. A communication interface of the CDCAP device 202, such as the network interface 114 of the computer system 102 of FIG. 1, operatively couples and communicates between the CDCAP device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the CDCAP device 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, non-transitory computer readable media, and CDCAP devices that efficiently implement a method for automating a process of downloading and analyzing messages from conversation rooms and chat rooms to determine topics, entities, context, and actionable items.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The CDCAP device 202 may be a standalone device or integrated with one or more other devices or apparatuses, such as one or more of the server devices 204(1)-204(n), for example. In one particular example, the CDCAP device 202 may include or be hosted by one of the server devices 204(1)-204(n), and other arrangements are also possible. Moreover, one or more of the devices of the CDCAP device 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the CDCAP device 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store historical data that relates to chat room conversations and data that relates to measurable chat room metrics and statistics.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. For example, the client devices 208(1)-208(n) in this example may include any type of computing device that can interact with the CDCAP device 202 via communication network(s) 210. Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, i.e., a smart phone.

The client devices 208(1)-208(n) may run interface applications, such as standard web browsers or standalone client applications, which may provide an interface to communicate with the CDCAP device 202 via the communication network(s) 210 in order to communicate user requests and information. The client devices 208(1)-208(n) may further include, among other features, a display device, such as a display screen or touchscreen, and/or an input device, such as a keyboard, for example.

Although the exemplary network environment 200 with the CDCAP device 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the CDCAP device 202, the server devices 204(1)-204(n), or the client devices 208(1)-208(n), for example, may be configured to operate as virtual instances on the same physical machine. In other words, one or more of the CDCAP device 202, the server devices 204(1)-204(n), or the client devices 208(1)-208(n) may operate on the same physical device rather than as separate devices communicating through communication network(s) 210. Additionally, there may be more or fewer CDCAP devices 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
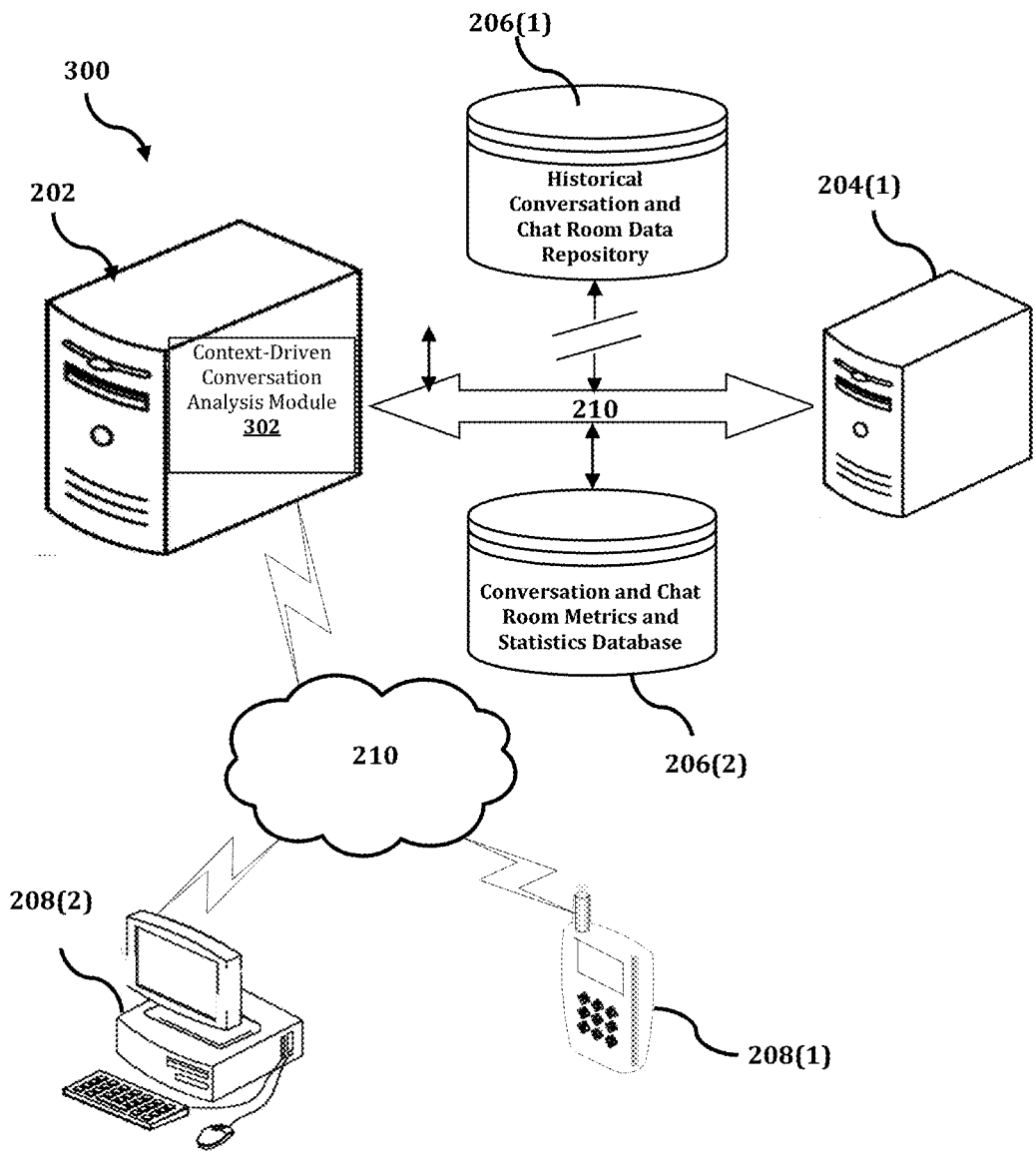
FIG. 3 shows an exemplary system for implementing a method for automating a process of downloading and analyzing messages from conversation rooms and chat rooms to determine topics, entities, context, and actionable items.

The CDCAP device 202 is described and illustrated in FIG. 3 as including a context-driven conversation analysis module 302, although it may include other rules, policies, modules, databases, or applications, for example. As will be described below, the context-driven conversation analysis module 302 is configured to implement a method for automating a process of downloading and analyzing messages from conversation rooms and chat rooms to determine topics, entities, context, and actionable items.

An exemplary process 300 for implementing a mechanism for automating a process of downloading and analyzing messages from conversation rooms and chat rooms to determine topics, entities, context, and actionable items by utilizing the network environment of FIG. 2 is illustrated as being executed in FIG. 3. Specifically, a first client device 208(1) and a second client device 208(2) are illustrated as being in communication with CDCAP device 202. In this regard, the first client device 208(1) and the second client device 208(2) may be "clients" of the CDCAP device 202 and are described herein as such. Nevertheless, it is to be known and understood that the first client device 208(1) and/or the second client device 208(2) need not necessarily be "clients" of the CDCAP device 202, or any entity described in association therewith herein. Any additional or alternative relationship may exist between either or both of the first client device 208(1) and the second client device 208(2) and the CDCAP device 202, or no relationship may exist.

Further, CDCAP device 202 is illustrated as being able to access a historical conversation and chat room data repository 206(1) and a conversation and chat room metrics and statistics database 206(2). The context-driven conversation analysis module 302 may be configured to access these databases for implementing a method for automating a process of downloading and analyzing messages from conversation rooms and chat rooms to determine topics, entities, context, and actionable items.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the CDCAP device 202 via broadband or cellular communication. Of course, these embodiments are merely exemplary and are not limiting or exhaustive.

Upon being started, the context-driven conversation analysis module 302 executes a process for automating a process of downloading and analyzing messages from conversation rooms and chat rooms to determine topics, entities, context, and actionable items. An exemplary process for automating a process of downloading and analyzing messages from conversation rooms and chat rooms to determine topics, entities, context, and actionable items is generally indicated at flowchart 400 in FIG. 4.

Figure 4:
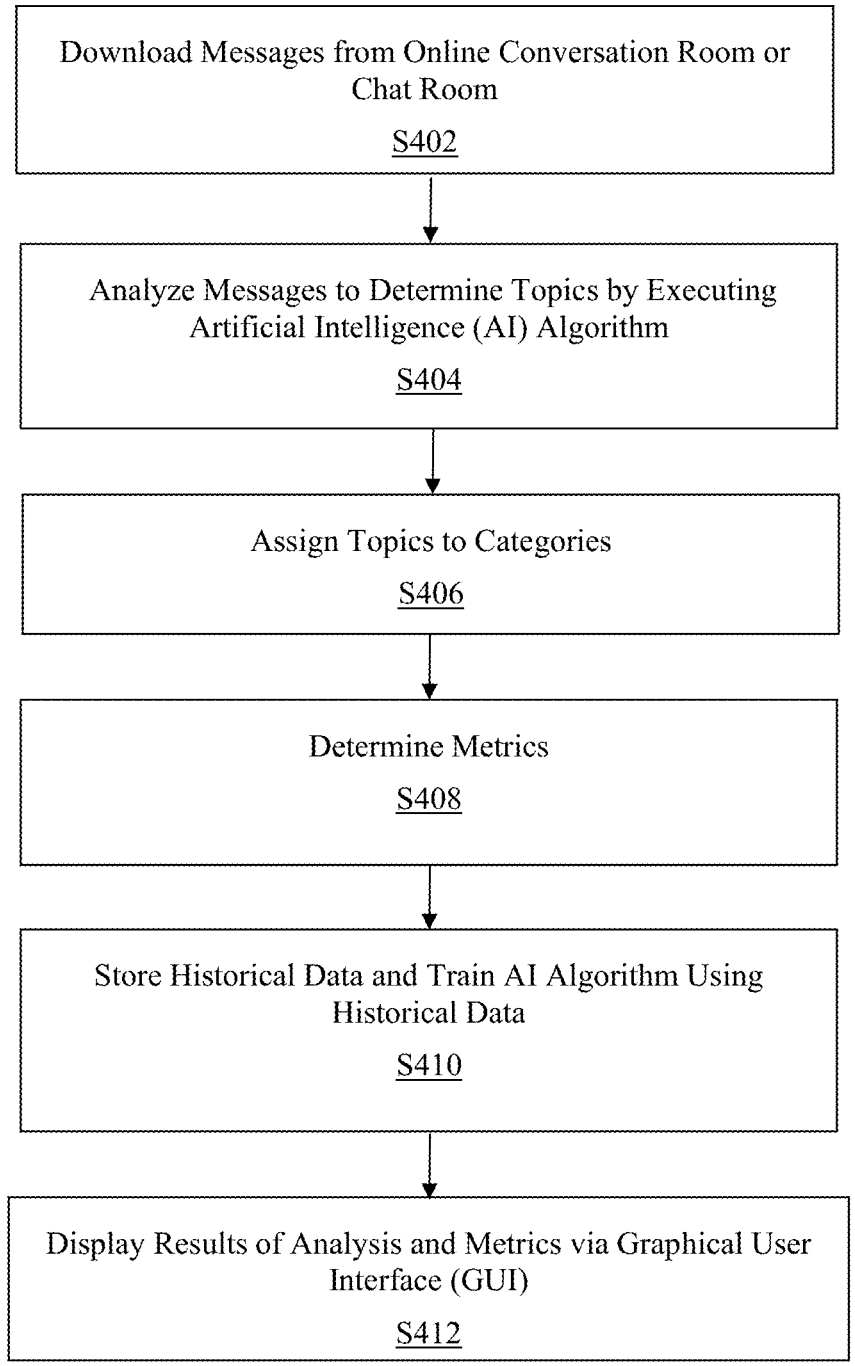
FIG. 4 is a flowchart of an exemplary process for implementing a method for automating a process of downloading and analyzing messages from conversation rooms and chat rooms to determine topics, entities, context, and actionable items.

In process 400 of FIG. 4, at step S402, the context-driven conversation analysis module 302 downloads a set of messages that have been communicated over a communication channel during a specific time interval. In an exemplary embodiment, the communication channel may include an online conversation room and/or an online chat room.

At step S404, the context-driven conversation analysis module 302 analyzes each of the downloaded messages in order to determine one or more respective topics that relate to the corresponding message. In an exemplary embodiment, the analysis may be performed by executing an artificial intelligence (AI) algorithm that is based on a Natural Language Processing (NLP) model and uses a machine learning technique to determine the topic(s) that relate to each respective message. In an exemplary embodiment, a Natural Language Generation (NLG) technique may be used to automatically generate one or more responses to each chat that is conducted over the communication channel.

At step S406, the context-driven conversation analysis module 302 assigns each respective topic to one or more categories from among a predetermined set of categories. In an exemplary embodiment, the predetermined set of categories includes any one or more of a first category that relates to an execution of a trade, a second category that relates to a settlement of a transaction and a delivery associated with a completion of the transaction, a third category that relates to making a payment, a fourth category that relates to a market condition, a fifth category that relates to an initial client setup, a sixth category that relates to a client account, a seventh category that relates to billing, an eighth category that relates to a client request/instruction, a ninth category that relates to corporate action, and a tenth category that relates to reporting. However, the predetermined set of categories is not fixed and the number of categories is not fixed, and they may be adjusted or updated based on domain.

At step S408, the context-driven conversation analysis module 302 determines one or more metrics that relate to the downloaded messages. In an exemplary embodiment, the determination is based on a result of the analysis performed in step S404. The metrics may include at least one category-specific metric. In an exemplary embodiment, the metrics may include any one or more of a number of chats that were conducted over the communication channel during the specific time interval, an average response time that relates to the chats that were conducted over the communication channel during the specific time interval, and a respective active conversation duration that relates to each corresponding chat that was conducted over the communication channel during the specific time interval.

At step S410, the context-driven conversation analysis module 302 stores historical data that relates to the downloaded messages in a memory. In an exemplary embodiment, the historical data is usable for training the AI algorithm that is executed in step S404, in order to improve a quality of the analysis on an ongoing basis. Then, at step S412, the context-driven conversation analysis module 302 displays results of the analysis and depictions of the metrics via a graphical user interface (GUI), in order to notify users about the downloaded messages.

Figure 5:
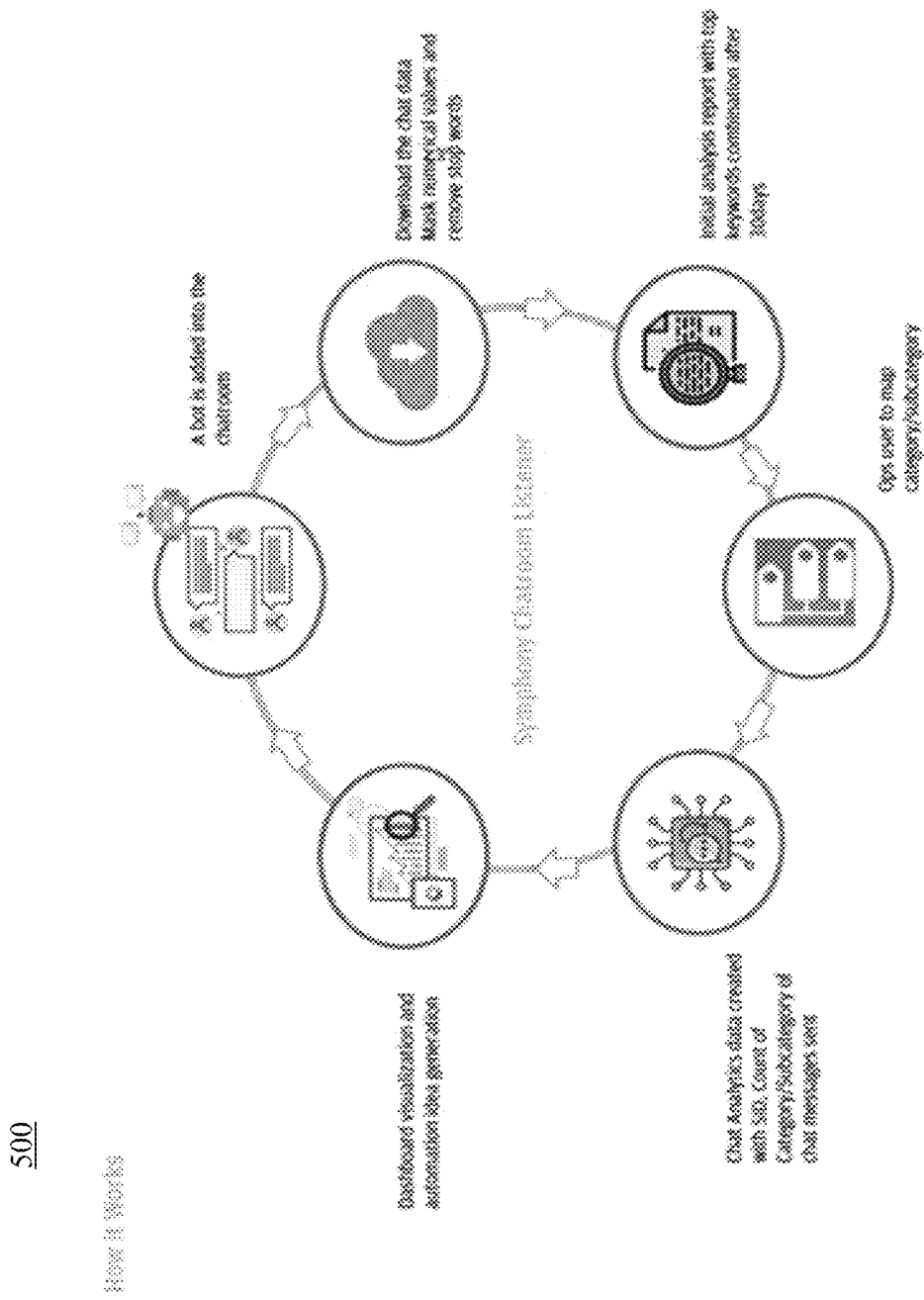
FIG. 5 is a flow diagram that illustrates a method for automating a process of downloading and analyzing messages from conversation rooms and chat rooms to determine topics, entities, context, and actionable items, according to an exemplary embodiment.

FIG. 5 is a flow diagram 500 that illustrates a method for automating a process of downloading and analyzing messages from conversation rooms and chat rooms to determine topics, entities, context, and actionable items, according to an exemplary embodiment. At the top center of flow diagram 500, a bot is added into authorized chat rooms, and then the bot downloads the chat data on a daily basis. In an exemplary embodiment, when the chat data is downloaded, the bot masks numerical values and removes stop words, in order to protect sensitive data and to dispense with non-substantive portions of the chat data. Then, the bot produces an initial analysis report with top keywords and combinations thereof after a predetermined time interval, such as, for example, 30 days. The initial analysis report is used to generate a mapping of topics to categories and sub-categories, and then a chat analytics data report is created. In the chat analytics data report, a count of chat messages for each category and each sub-category is provided. Lastly, the chat analytics data report is used to produce a dashboard visualization and automation idea generation, which may be displayed to users via a graphical user interface (GUI).

Figure 6:
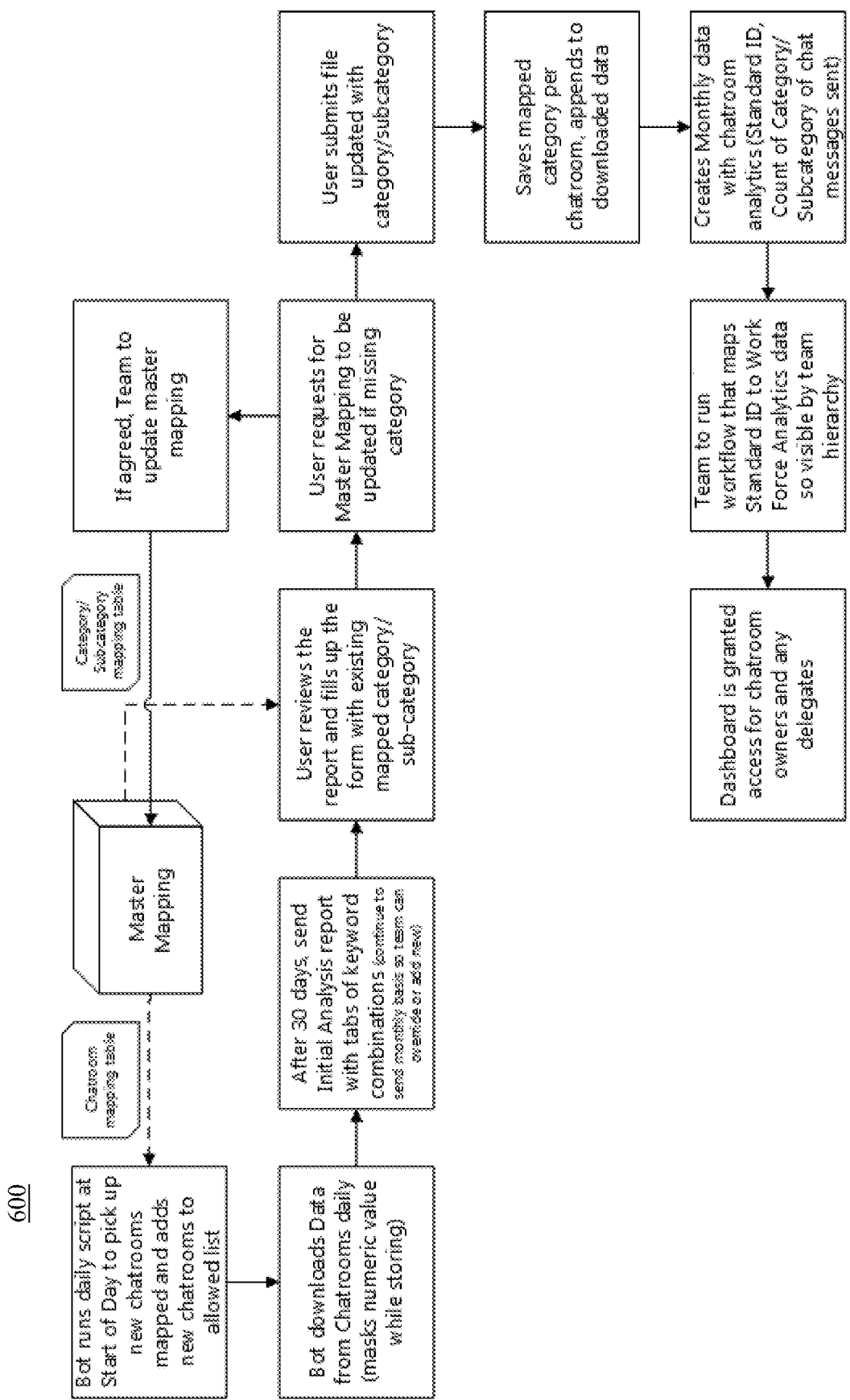
FIG. 6 is a block diagram that illustrates a method for automating a process of downloading and analyzing messages from conversation rooms and chat rooms to determine topics, entities, context, and actionable items, according to an exemplary embodiment.

FIG. 6 is a block diagram 600 that illustrates a method for automating a process of downloading and analyzing messages from conversation rooms and chat rooms to determine topics, entities, context, and actionable items, according to an exemplary embodiment. Starting at the top left portion of block diagram 600, in a first operation, a bot runs a daily script to pick up new chat rooms that have been mapped and adds new chat rooms to an allowed list. In a second operation, the bot downloads data from each chat room included in the allowed list on a daily basis. Numerical values are masked during the storage process to protect sensitive data.

In a third operation, after 30 days, an initial analysis report is generated, with tabs of keyword combinations. Then, in a fourth operation, a user reviews the initial analysis report and fills up the form with existing mapped categories and sub-categories. In a fifth operation, the user requests for a master mapping module to be updated if it is missing any categories or sub-categories, and the master mapping module is then updated.

In a sixth operation, the user submits a file that is updated with respect to categories and sub-categories, and then saves mapped category data with respect to each chat room and appends this saved data to the downloaded data in a seventh operation. In an eighth operation, a monthly chat analytics data report is created. In the monthly chat analytics data report, a count of chat messages for each category and each sub-category is provided. Lastly, the chat analytics data report is used to produce a dashboard visualization and automation idea generation, which may be displayed to selected users, such as chat room owners and delegates thereof, via a graphical user interface (GUI).

Figure 7:
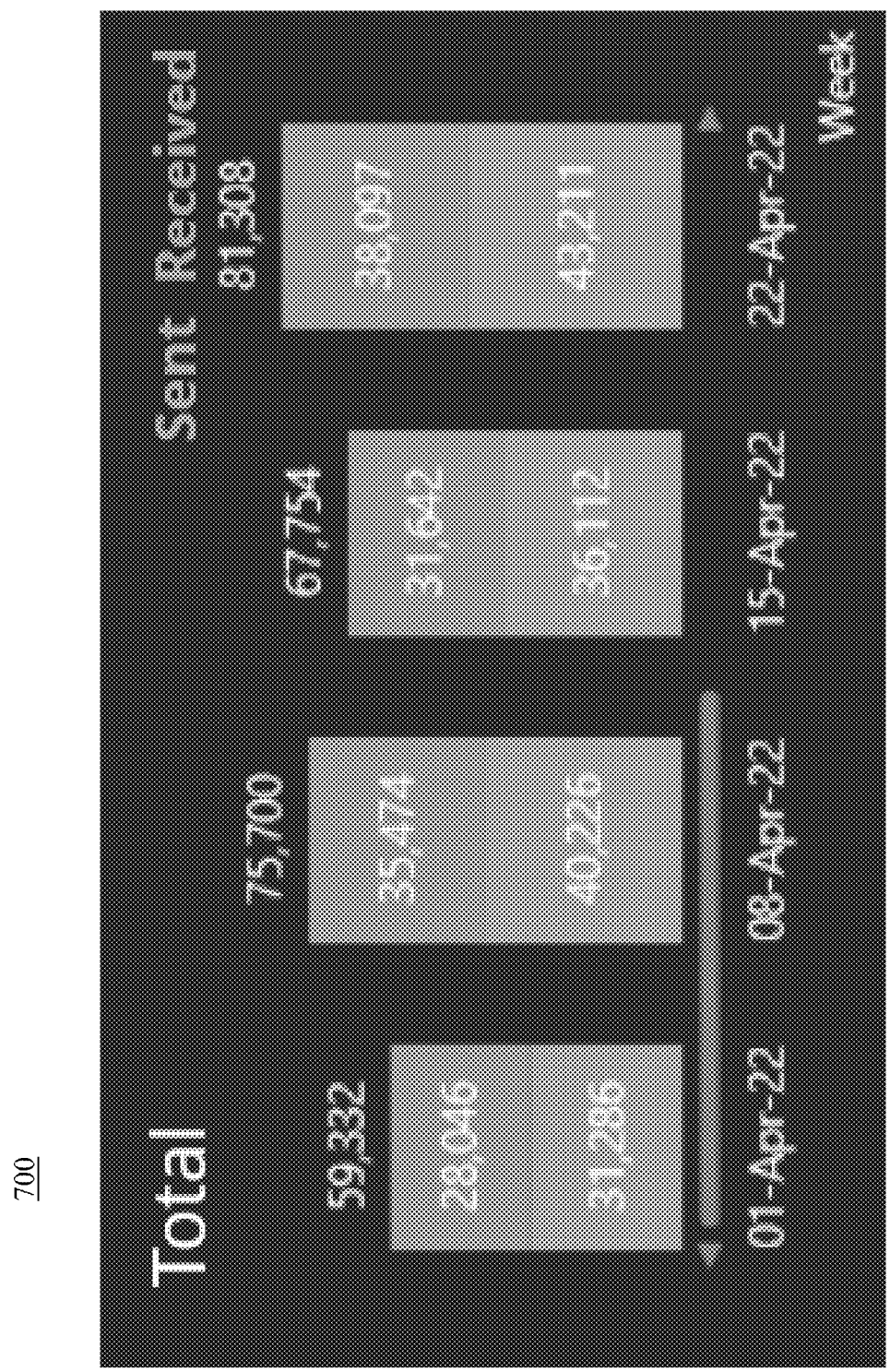
FIG. 7 is a first screenshot that illustrates a first set of metrics that are compiled with respect to a chatroom and displayed on a graphical user interface (GUI), according to an exemplary embodiment.

FIG. 7 is a first screenshot 700 that illustrates a first set of metrics that are compiled with respect to a chatroom and displayed on a GUI, according to an exemplary embodiment. As illustrated in screenshot 700, the first set of metrics may include a total number of messages for each of several particular weeks, a number of sent messages broken down for each week, and a number of received messages broken down for each week.

Figure 8:
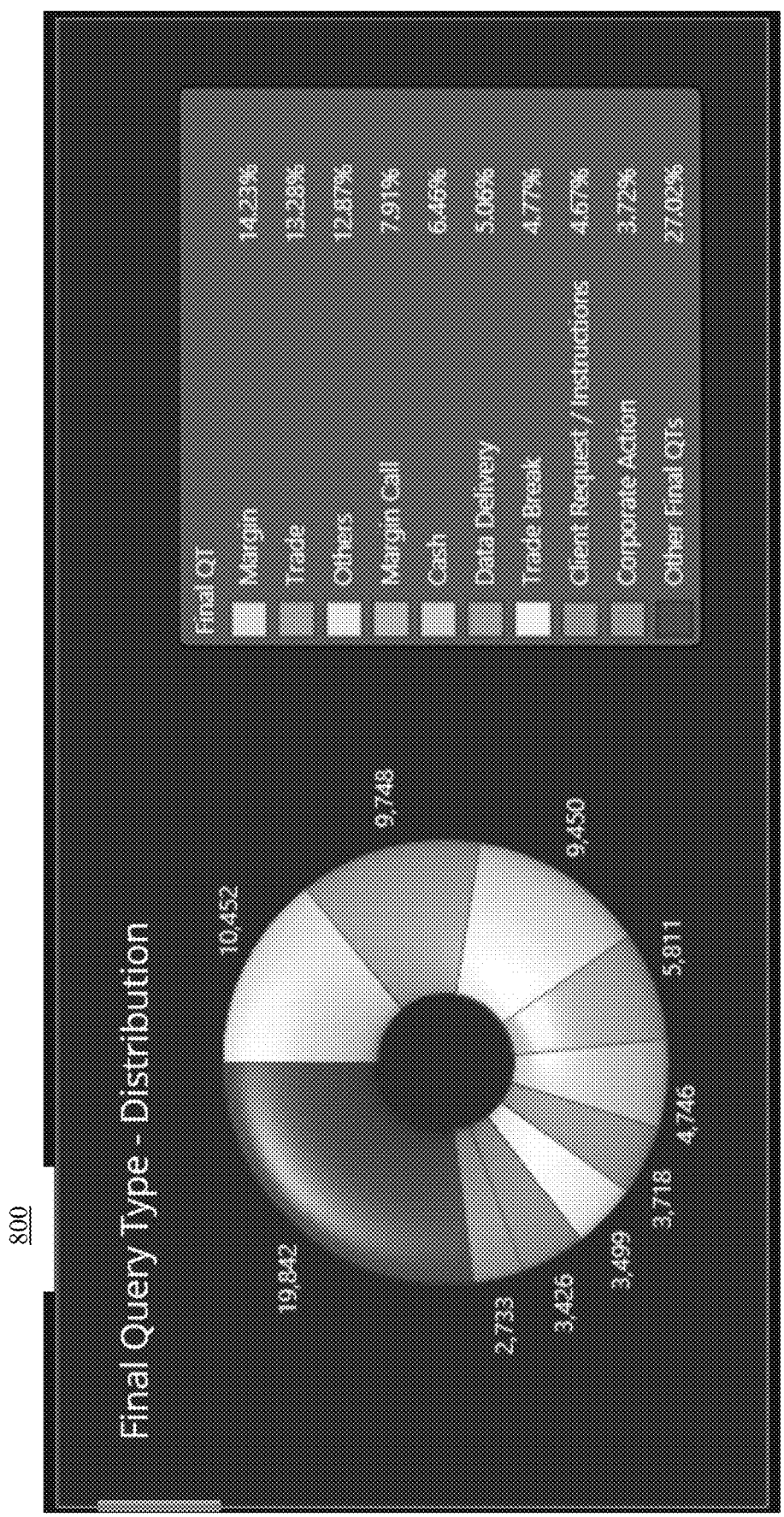
FIG. 8 is a second screenshot that illustrates a second set of metrics that are compiled with respect to a chatroom and displayed on a GUI, according to an exemplary embodiment.

FIG. 8 is a second screenshot 800 that illustrates a second set of metrics that are compiled with respect to a chatroom and displayed on a GUI, according to an exemplary embodiment. As illustrated in screenshot 800, the second set of metrics may include information about a percentage distribution of chat room messages with respect to categories and sub-categories such as, for example, a blank category, a margin call move category, a transaction status category, a data delivery issue category, a partially agree category, a missing trade category, a market information/deadline category, a missing/unmatched transaction category, a margin call category, and an other final query sub-types category.

Figure 9:
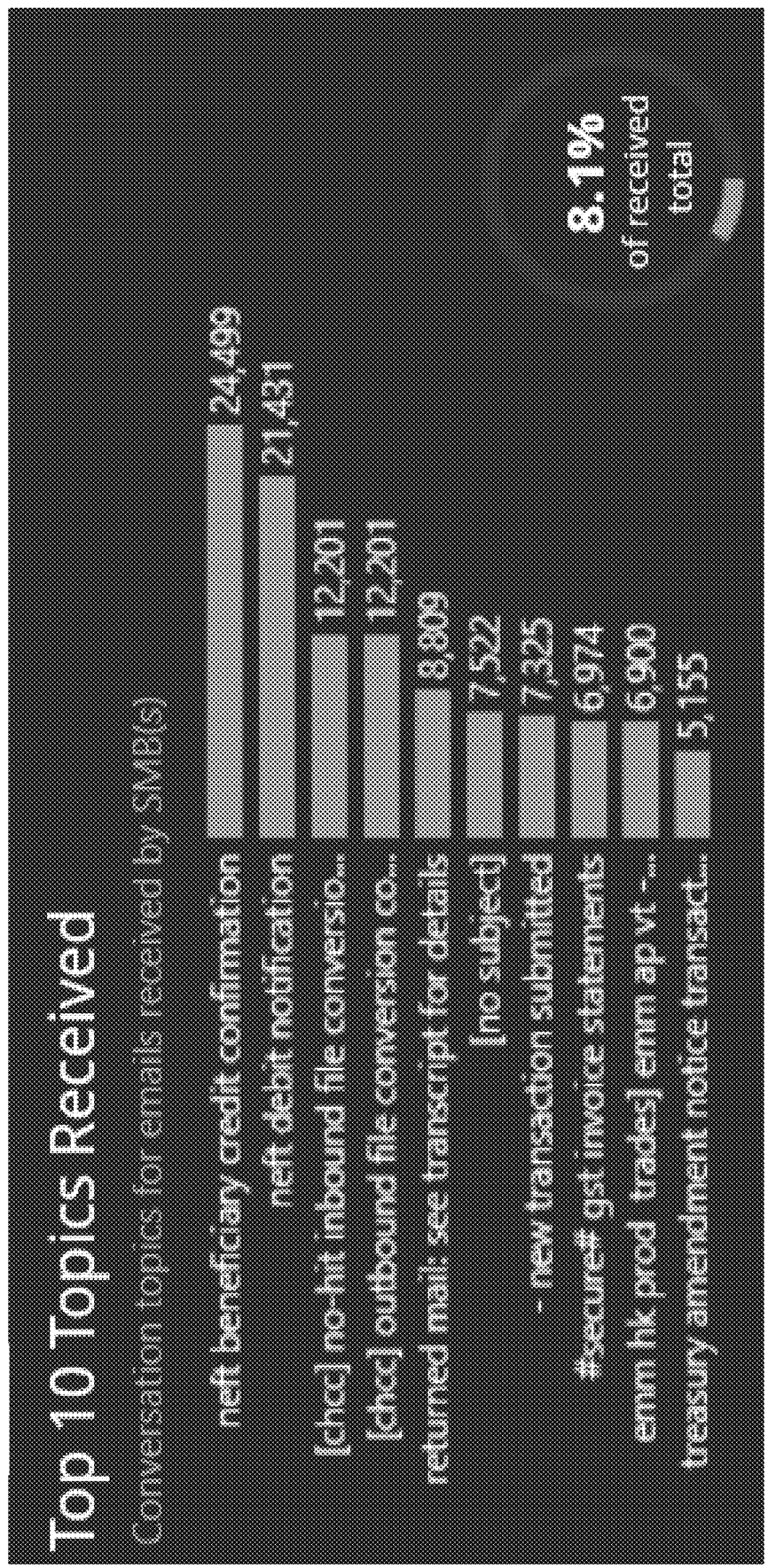
FIG. 9 is a third screenshot that illustrates a third set of metrics that are compiled with respect to a chatroom and displayed on a GUI, according to an exemplary embodiment.

FIG. 9 is a third screenshot 900 that illustrates a third set of metrics that are compiled with respect to a chatroom and displayed on a GUI, according to an exemplary embodiment. As illustrated in screenshot 900, the third set of metrics may include a listing of the top ten conversation topics for received emails, together with associated raw numerical data indicating a number of emails for each topic. For example, the topics may include any one or more of the following: beneficiary credit confirmation; debit notification; no-hit inbound file conversion; outbound file conversion; no subject; new transaction submitted; data validation alert; and return status update.

Figure 10:
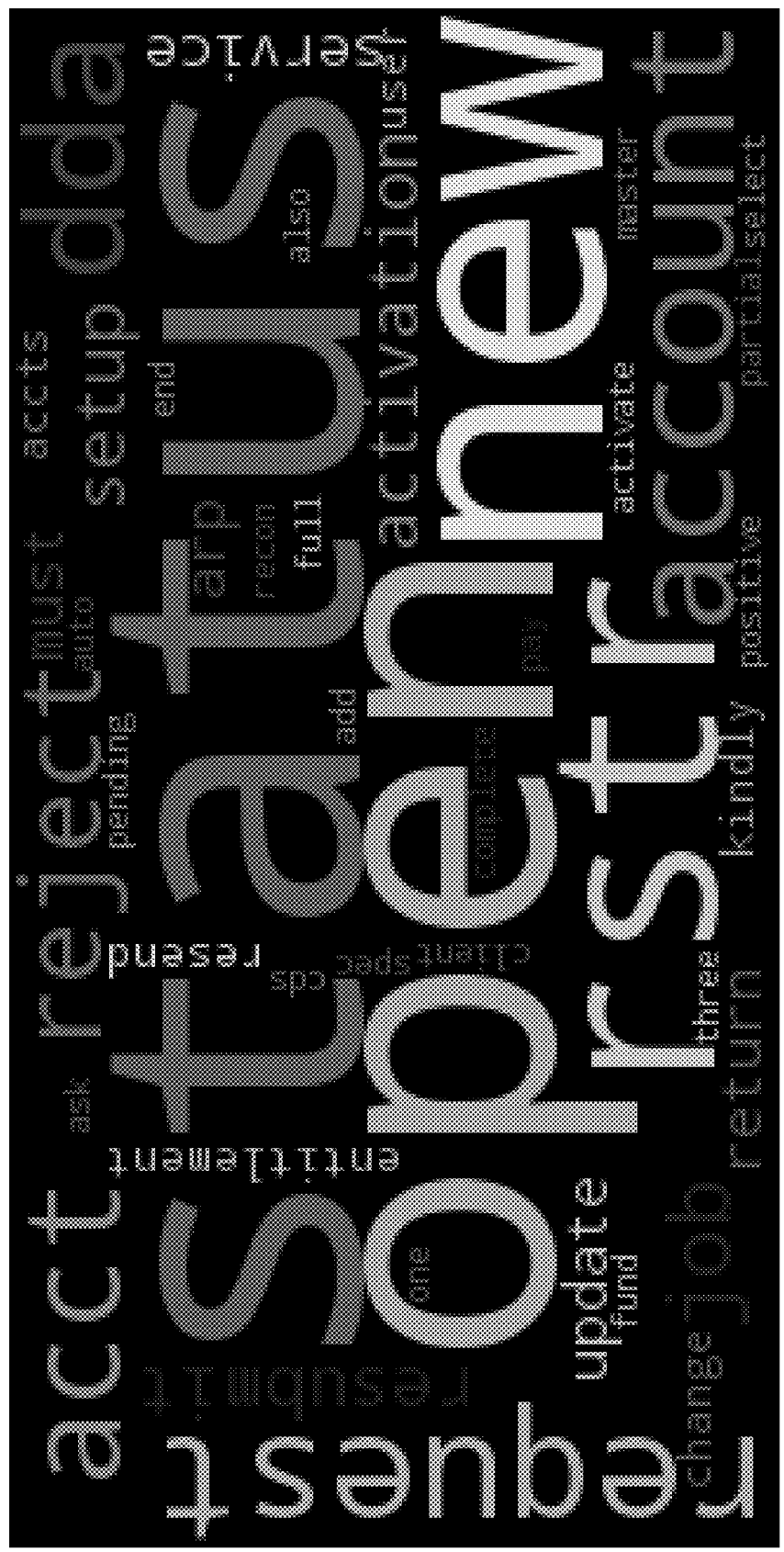
FIG. 10 is a fourth screenshot that illustrates a word cloud that corresponds to metrics that are compiled with respect to a chatroom and displayed on a GUI, according to an exemplary embodiment.

FIG. 10 is a fourth screenshot 1000 that illustrates a word cloud that corresponds to metrics that are compiled with respect to a chatroom and displayed on a GUI, according to an exemplary embodiment. As illustrated in screenshot 1000, the word cloud shows words that are used in messages that have been downloaded from a chat room, and the size of the letters in a particular word acts as an indicator of a frequency with which that particular word appears in the downloaded message. Thus, for example the words "status," "open," and "new" are shown in relatively large lettering, thereby reflecting a relatively high frequency thereof, and the words "return, "positive," and "service" are shown in relatively smaller lettering, thereby reflecting a lower frequency thereof.

Figure 11:
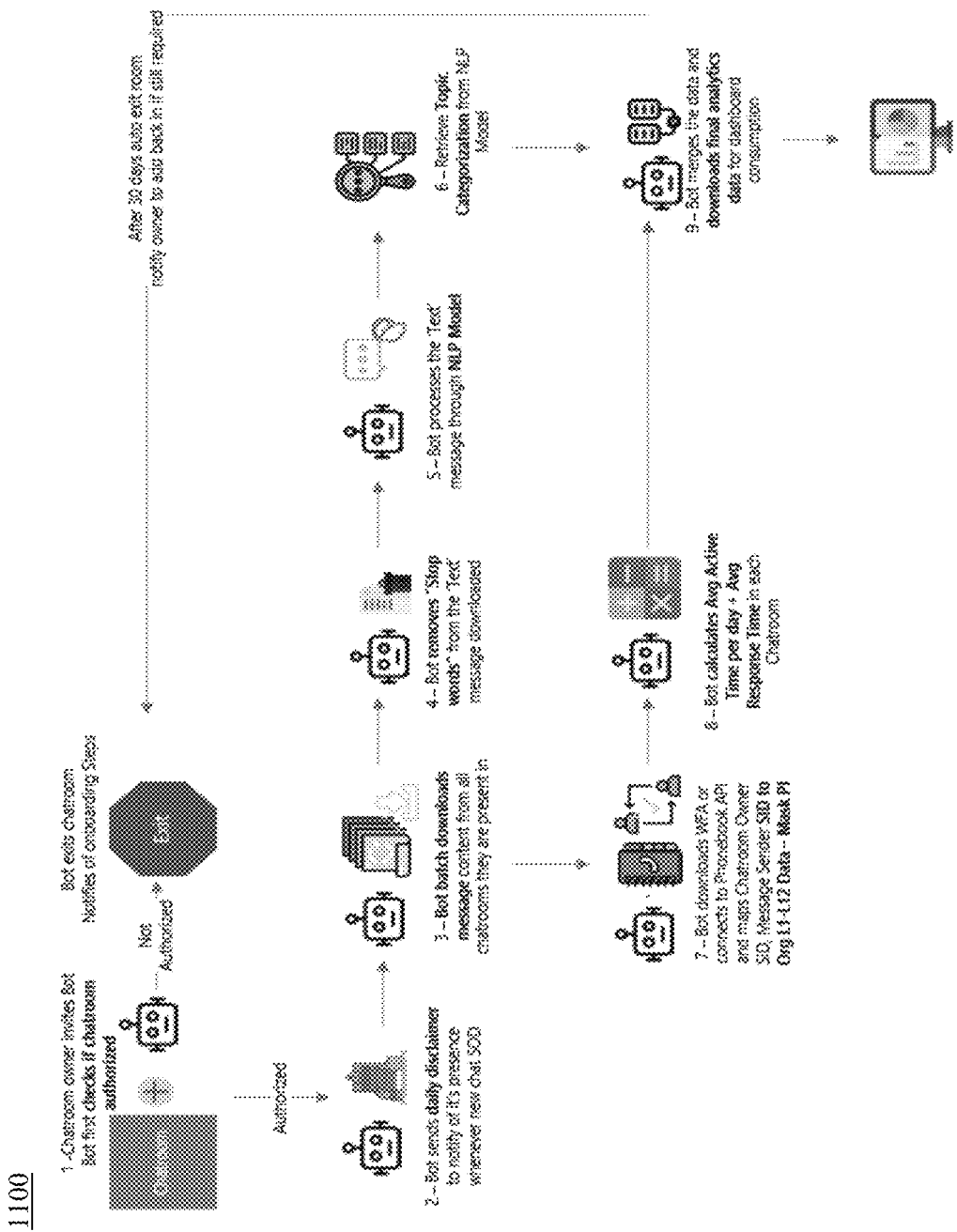
FIG. 11 is a flow diagram that illustrates a method for automating a process of downloading and analyzing messages from conversation rooms and chat rooms to determine topics, entities, context, and actionable items, according to an exemplary embodiment.

FIG. 11 is a flow diagram 1100 that illustrates a robot ("Bot") system design for implementing a method for automating a process of downloading and analyzing messages from conversation rooms and chat rooms to determine topics, entities, context, and actionable items, according to an another exemplary embodiment. In flow diagram 1100, in operation 1, a chatroom owner invites a Bot to enter the chatroom. Before entering, the Bot checks whether the chatroom is authorized, and if it is not authorized, the Bot exits the chatroom and notifies the chatroom owner of onboarding steps for obtaining authorization.

If the chatroom is authorized, then in operation 2, the Bot sends a daily disclaimer to notify of its presence whenever a new chat SOD appears. In operation 3, the Bot batch downloads message content from all chatrooms in which the Bot is present. In operation 4, the Bot removes stop words from the text in a downloaded message. In operation 5, the Bot processes the text in the downloaded message through an NLP model. In operation 6, a topic categorization is retrieved from the NLP model.

Operation 7 also follows directly from operation 3. In operation 7, the Bot downloads Work Force Analytics (WFA) or connects to a phonebook application programming interface (API) and maps the Chatroom Owner Standard Identification (SID) and the message sender SID to organizational level data, i.e., reporting hierarchy data with levels L1 through L12, and then masks the personal identification (PI) data. In operation 8, the Bot calculates an average active time per day and an average response time in each chatroom.

Operation 9 follows directly from operation 8 and also from operation 6. In operation 9, the Bot merges the data obtained in operations 6 and 8 and downloads final analytics data for dashboard consumption. The analytics data is then displayable via a dashboard GUI.

Accordingly, with this technology, an optimized process for automating a process of downloading and analyzing messages from conversation rooms and chat rooms to determine topics, entities, context, and actionable items is provided.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims, and their equivalents, and shall not be restricted or limited by the foregoing detailed description.

What is claimed is:

1. A method for analyzing a chat room conversation, the method being implemented by at least one processor, the method comprising:
   downloading, by the at least one processor, a plurality of messages that have been communicated over a first communication channel during a predetermined first time interval;
   analyzing, by the at least one processor, each respective message from among the plurality of messages in order to determine at least one respective topic that relates to each respective message;
   determining, by the at least one processor based on a result of the analyzing, at least one metric that relates to the plurality of messages; and
   storing, in a memory by the at least one processor, historical data that relates to the downloaded plurality of messages and each of the determined at least one metric,
   wherein the at least one metric includes at least one from among a number of chats that were conducted over the first communication channel during the first time interval, an average response time that relates to the chats that were conducted over the first communication channel during the first time interval, and a respective active conversation duration that relates to each corresponding chat that was conducted over the first communication channel during the first time interval.

2. The method of claim 1, wherein the analyzing comprises executing an artificial intelligence (AI) algorithm that is based on a Natural Language Processing (NLP) model and uses a machine learning technique to determine the at least one respective topic that relates to each respective message.

3. The method of claim 2, further comprising using the stored historical data to train the AI algorithm.

4. The method of claim 1, further comprising using a Natural Language Generation (NLG) technique to automatically generate at least one response to at least one chat that was conducted over the first communication channel.

5. The method of claim 1, further comprising assigning each respective topic to a corresponding category from among a predetermined set of categories,
wherein the at least one metric includes at least one category-specific metric.

6. The method of claim 5, wherein the predetermined set of categories includes at least one from among a first category that relates to an execution of a trade, a second category that relates to a settlement of a transaction and a delivery associated with a completion of the transaction, a third category that relates to making a payment, a fourth category that relates to a market condition, a fifth category that relates to an initial client setup, a sixth category that relates to a client account, a seventh category that relates to billing, an eighth category that relates to a client request/instruction, a ninth category that relates to corporate action, and a tenth category that relates to reporting.

7. The method of claim 1, further comprising displaying, by the at least one processor, a graphical user interface (GUI) that includes information that relates to at least one from among a result of the analyzing and the at least one metric.

8. A computing apparatus for analyzing a chat room conversation, the computing apparatus comprising:
a processor;
a memory;
a display; and
a communication interface coupled to each of the processor, the memory, and the display,
wherein the processor is configured to:
download, via the communication interface, a plurality of messages that have been communicated over a first communication channel during a predetermined first time interval;
analyze each respective message from among the plurality of messages in order to determine at least one respective topic that relates to each respective message;
determine, based on a result of the analysis, at least one metric that relates to the plurality of messages; and
store, in the memory, historical data that relates to the downloaded plurality of messages and each of the determined at least one metric,
wherein the at least one metric includes at least one from among a number of chats that were conducted over the first communication channel during the first time interval, an average response time that relates to the chats that were conducted over the first communication channel during the first time interval, and a respective active conversation duration that relates to each corresponding chat that was conducted over the first communication channel during the first time interval.

9. The computing apparatus of claim 8, wherein the processor is further configured to execute an artificial intelligence (AI) algorithm that is based on a Natural Language Processing (NLP) model and uses a machine learning technique to determine the at least one respective topic that relates to each respective message.

10. The computing apparatus of claim 9, wherein the processor is further configured to use the stored historical data to train the AI algorithm.

11. The computing apparatus of claim 8, wherein the processor is further configured to use a Natural Language Generation (NLG) technique to automatically generate at least one response to at least one chat that was conducted over the first communication channel.

12. The computing apparatus of claim 8, wherein the processor is further configured to assign each respective topic to a corresponding category from among a predetermined set of categories,
wherein the at least one metric includes at least one category-specific metric.

13. The computing apparatus of claim 12, wherein the predetermined set of categories includes at least one from among a first category that relates to an execution of a trade, a second category that relates to a settlement of a transaction and a delivery associated with a completion of the transaction, a third category that relates to making a payment, a fourth category that relates to a market condition, a fifth category that relates to an initial client setup, a sixth category that relates to a client account, a seventh category that relates to billing, an eighth category that relates to a client request/instruction, a ninth category that relates to corporate action, and a tenth category that relates to reporting.

14. The computing apparatus of claim 8, wherein the processor is further configured to cause the display to display a graphical user interface (GUI) that includes information that relates to at least one from among a result of the analyzing and the at least one metric.

15. A non-transitory computer readable storage medium storing instructions for analyzing a chat room conversation, the storage medium comprising executable code which, when executed by a processor, causes the processor to:
download a plurality of messages that have been communicated over a first communication channel during a predetermined first time interval;
analyze each respective message from among the plurality of messages in order to determine at least one respective topic that relates to each respective message;
determine, based on a result of the analysis, at least one metric that relates to the plurality of messages; and
store, in a memory, historical data that relates to the downloaded plurality of messages and each of the determined at least one metric,
wherein the at least one metric includes at least one from among a number of chats that were conducted over the first communication channel during the first time interval, an average response time that relates to the chats that were conducted over the first communication channel during the first time interval, and a respective active conversation duration that relates to each corresponding chat that was conducted over the first communication channel during the first time interval.

16. The storage medium of claim 15, wherein the executable code further causes the processor to execute an artificial intelligence (AI) algorithm that is based on a Natural Language Processing (NLP) model and uses a machine learning technique to determine the at least one respective topic that relates to each respective message.

17. The storage medium of claim 16, wherein the executable code further causes the processor to use the stored historical data to train the AI algorithm.

* * * * *